(12) United States Patent
Cmielowski et al.

(10) Patent No.: US 11,237,942 B2
(45) Date of Patent: Feb. 1, 2022

(54) MODEL COMPARISON WITH UNKNOWN METRIC IMPORTANCE

(71) Applicant: INTERNATIONAL BUSINESS MACHINES CORPORATION, Armonk, NY (US)

(72) Inventors: Lukasz G. Cmielowski, Cracow (PL); Wojciech Sobala, Cracow (PL); Rafal Bigaj, Cracow (PL); Maksymilian Erazmus, Zasów (PL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/816,344

(22) Filed: Mar. 12, 2020

(65) Prior Publication Data
US 2021/0286703 A1 Sep. 16, 2021

(51) Int. Cl.
  *G06F 11/36* (2006.01)
  *G06N 5/04* (2006.01)
  *G06N 20/00* (2019.01)

(52) U.S. Cl.
  CPC ........ *G06F 11/3608* (2013.01); *G06F 11/368* (2013.01); *G06F 11/3616* (2013.01); *G06F 11/3688* (2013.01); *G06N 5/04* (2013.01); *G06N 20/00* (2019.01)

(58) Field of Classification Search
  None
  See application file for complete search history.

(56) References Cited

U.S. PATENT DOCUMENTS

| 10,169,208 B1* | 1/2019 | Moyes | G06F 16/325 |
| 10,209,974 B1* | 2/2019 | Patton | G06N 20/00 |
| 10,635,519 B1* | 4/2020 | Tang | G06F 11/3447 |
| 2003/0200462 A1* | 10/2003 | Munson | G06F 21/55 726/26 |

(Continued)

OTHER PUBLICATIONS

"Unsupervised Learning," IBM Cloud Education, Sep. 21, 2020, last retrieved from https://www.ibm.com/cloud/learn/unsupervised-learning on Jul. 28, 2021 (Year: 2020).*

(Continued)

*Primary Examiner* — Andrew M. Lyons
(74) *Attorney, Agent, or Firm* — Robert Shatto; Andrew D. Wright; Roberts Calderon Safran & Cole, P.C.

(57) ABSTRACT

A method includes generating first metric data by executing a test suite on a first version of a software model; generating second metric data by executing the test suite on a second version of the software model; generating first and second version principal components that represent the first and second metric data by executing a dimension reduction technique on the first and second metric data; determining at least one control limit based on at least one of the first version principal components; determining a mean value of one of the second version principal components; determining whether the second version of the software model performs within at least one control limit by comparing the mean value to the at least one control limit; and notifying a user of the results of the determining whether the second version of the software model performs within the at least one control limit.

20 Claims, 6 Drawing Sheets

(56) References Cited

U.S. PATENT DOCUMENTS

| | | | |
|---|---|---|---|
| 2015/0161516 A1* | 6/2015 | Ghassemzadeh | G06N 5/04 706/12 |
| 2017/0242663 A1* | 8/2017 | Abu Hassan | G06F 8/77 |
| 2018/0005161 A1* | 1/2018 | Cong | G06Q 10/06398 |
| 2019/0034803 A1 | 1/2019 | Gotou | |
| 2020/0387565 A1* | 12/2020 | Caglar | G06N 20/00 |

OTHER PUBLICATIONS

J. Stuckman, J. Walden and R. Scandariato, "The Effect of Dimensionality Reduction on Software Vulnerability Prediction Models," in IEEE Transactions on Reliability, vol. 66, No. 1, pp. 17-37, Mar. 2017, doi: 10.1109/TR.2016.2630503. (Year: 2017).*

Das, "Machine Learning Models: Deployment Activities", https://dzone.com/articles/machine-learning-models-post-deployment-activities, DZone, Feb. 5, 2019, 3 pages.

Anonymous, "Evaluate Model", https://docs.microsoft.com/en-us/azure/machine-learning/studio-module-reference/evaluate-model, Microsoft Azure, May 6, 2019, 9 pages.

Anonymous, "System and Method to create a Platform for Model Comparison and Factsheet Recommendations", https://priorart.ip.com/IPCOM/000260321, IP.com, Nov. 12, 2019, 3 pages.

Ringnér, "What is principal component analysis?", https://www.nature.com/articles/nbt0308-303, Nature Biotechnology, vol. 26, No. 3, Mar. 2008, 2 pages.

Zheng, "Evaluating Machine Learning Models", http://www.pindex.com/uploads/post_docs/evaluating-machine-earning-models(PINDEX-DOC-6950).pdf, O'Reilly, Sep. 1, 2015, 59 pages.

Mell et al., "The NIST Definition of Cloud Computing", NIST, Special Publication 800-145, Sep. 2011, 7 pages.

Anonymous, "Metrics and scoring: quantifying the quality of predictions", https://scikitlearn.org/stable/modules/model_evaluation.html, scikit-learn, accessed Mar. 12, 2020, 26 pages.

Anonymous, "Table of Control Chart Constants", http://www.bessegato.com.br/UFJF/resources/table_of_control_chart_constants_old.pdf, Bessegato, accessed Mar. 12, 2020, 1 page.

* cited by examiner

MODEL COMPARISON WITH UNKNOWN METRIC IMPORTANCE

BACKGROUND

Aspects of the present disclosure relate generally to testing software models and, more particularly, to comparing models when the importance of test metrics is unknown.

A new version of a software model is often tested to confirm that it is at least as good a model as a currently used version of the software. An example of a model is software that recommends items to a customer using an online shopping site. This testing can include running tests on a new version of the model and comparing the results with results of the same tests run on the currently used version. The result of a particular test is referred to as a metric that describes the performance of the model. Many different metrics can be used to evaluate the performance of a model. Which metrics are best suited for evaluating the model depends on the particular use of the model. Metrics include average accuracy, precision, recall or any other evaluation metric. In some cases, the user depending on the model decides which metric fits the best.

SUMMARY

In a first aspect of the disclosure, there is a computer-implemented method including: generating, by a computing device, first metric data by executing a test suite on a first version of a software model; generating, by the computing device, second metric data by executing the test suite on a second version of the software model; generating, by the computing device, first version principal components that represent the first metric data by executing a dimension reduction technique on the first metric data; generating, by the computing device, second version principal components that represent the second metric data by executing the dimension reduction technique on the second metric data; determining, by the computing device, at least one control limit based on at least one of the first version principal components; determining, by the computing device, a mean value of one of the second version principal components; determining, by the computing device, whether the second version of the software model performs within at least one control limit by comparing the mean value to the at least one control limit; and notifying, by the computer device, a user of the results of the determining whether the second version of the software model performs within the at least one control limit.

In another aspect of the disclosure, there is a computer program product including one or more computer readable storage media having program instructions collectively stored on the one or more computer readable storage media. The program instructions are executable to: generate second metric data by executing a test suite on a second version of a software model; generate first version principal components that represent first metric data by executing a dimension reduction technique on the first metric data, the first metric data corresponding to a first version of the software model; generate second version principal components that represent the second metric data by executing the dimension reduction technique on the second metric data; determine at least one control limit based on at least one of the first version principal components; determine a mean value of one of the second version principal components; and determine whether the second version of the software model performs within at least one control limit by comparing the mean value to the at least one control limit.

In another aspect of the disclosure, there is system including a processor, one or more computer readable storage media, and program instructions collectively stored on the one or more computer readable storage media. The program instructions are executable to: generate second metric data by executing a test suite on a second version of a software model; generate first version principal components that represent first metric data by executing a dimension reduction technique on the first metric data, the first metric data corresponding to a first version of the software model; generate second version principal components that represent the second metric data by executing the dimension reduction technique on the second metric data; determine at least one control limit based on at least one of the first version principal components; and determine a mean value of one of the second version principal components.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

DETAILED DESCRIPTION

Figure 1:
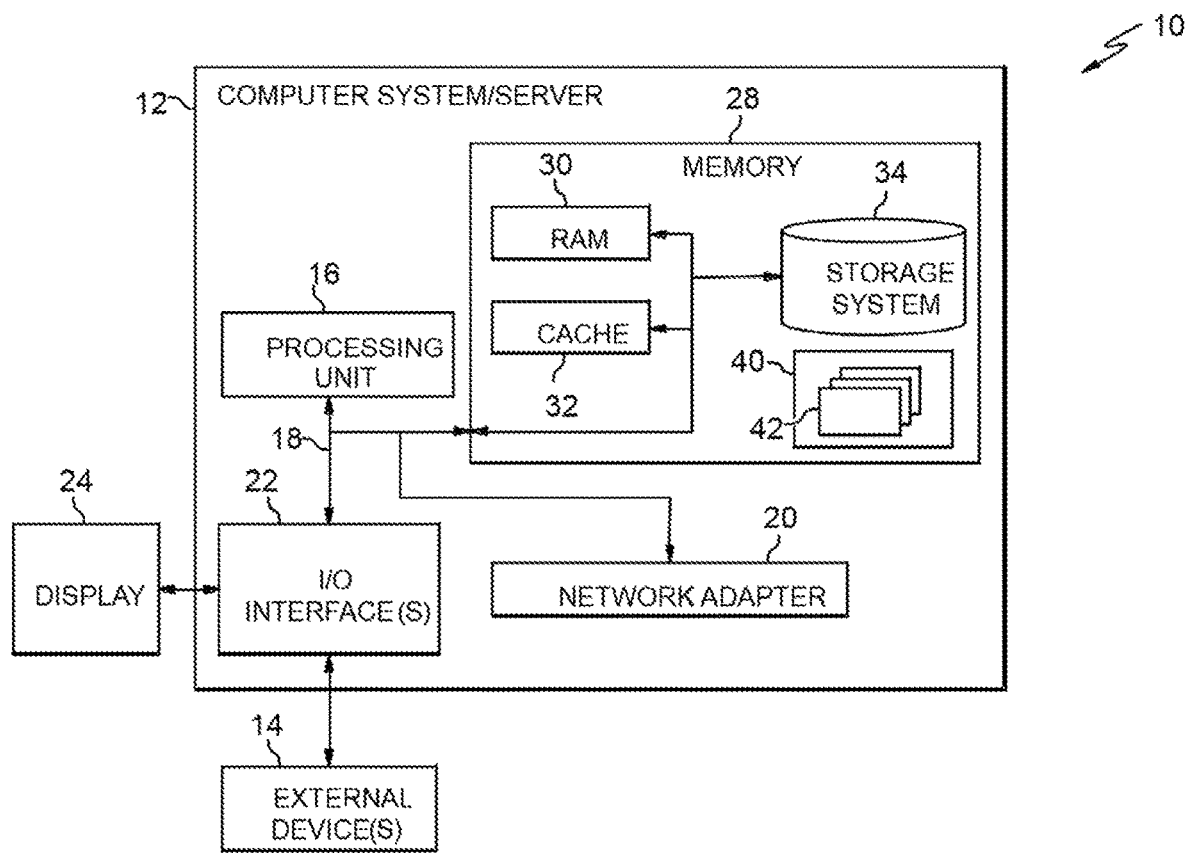
FIG. 1 depicts a cloud computing node according to an embodiment of the present invention.

Aspects of the present disclosure relate generally to testing software models and, more particularly, to comparing models when the importance of test metrics is unknown. According to aspects of the disclosure a test suite is executed on a current version of a software model and a new version of the software model to determine whether the new version is a better model than the current version. In embodiments, a dimension reduction technique is used to reduce the metrics considered in the test to one principal component that is compared to one or more control limits (which are determined by running the same process on the current version of the software). In this manner, implementations of the disclosure provide a method for comparing two versions of a software model when the importance of various metrics is unknown.

In an aspect of the disclosure, there is a method for metrics-based evaluation of a machine learning model. The method includes: generating a set of test metrics by processing, by the machine learning model in a test environment, a set of test data; generating a set of production metrics by processing, by the machine learning model in a production environment, the set of test data; executing a dimension reduction technique on the set of test metrics and the set of production metrics to obtain a set of metrics variance data; determining, from the set of metrics variance data, a subset of principle metrics; determining, from the set of metrics variance data, a set of control limits for each principle metric within the subset; calculating a mean value for each principle metric, based on the set of test metrics and the set of production metrics; determining the mean value for each principle metric complies with the associated set of control limits; and notifying a user of the set of principle metric mean value compliance determinations. In an aspect of the disclosure, the set of test data and the set of production data include data subsets for accuracy, precision, and recall. In an aspect of the disclosure, the dimension reduction technique includes principle component analysis. In an aspect of the disclosure, the set of control limits includes an upper control limit, a lower control limit, and an average.

Implementations of the disclosure are a practical application because they improve the technology of computer software model testing. For example, determining a principal component from metric data resulting from metrics from a test of a software model, and comparing a mean of the principal component to control limits can improve the accuracy of a computer system that compares two different versions of the software model.

It is to be understood that the aforementioned advantages, as well as other advantages described herein, are example advantages and should not be construed as limiting. Embodiments of the present disclosure can contain all, some, or none of the advantages while remaining within the spirit and scope of the present disclosure.

It should be understood that, to the extent implementations of the disclosure collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
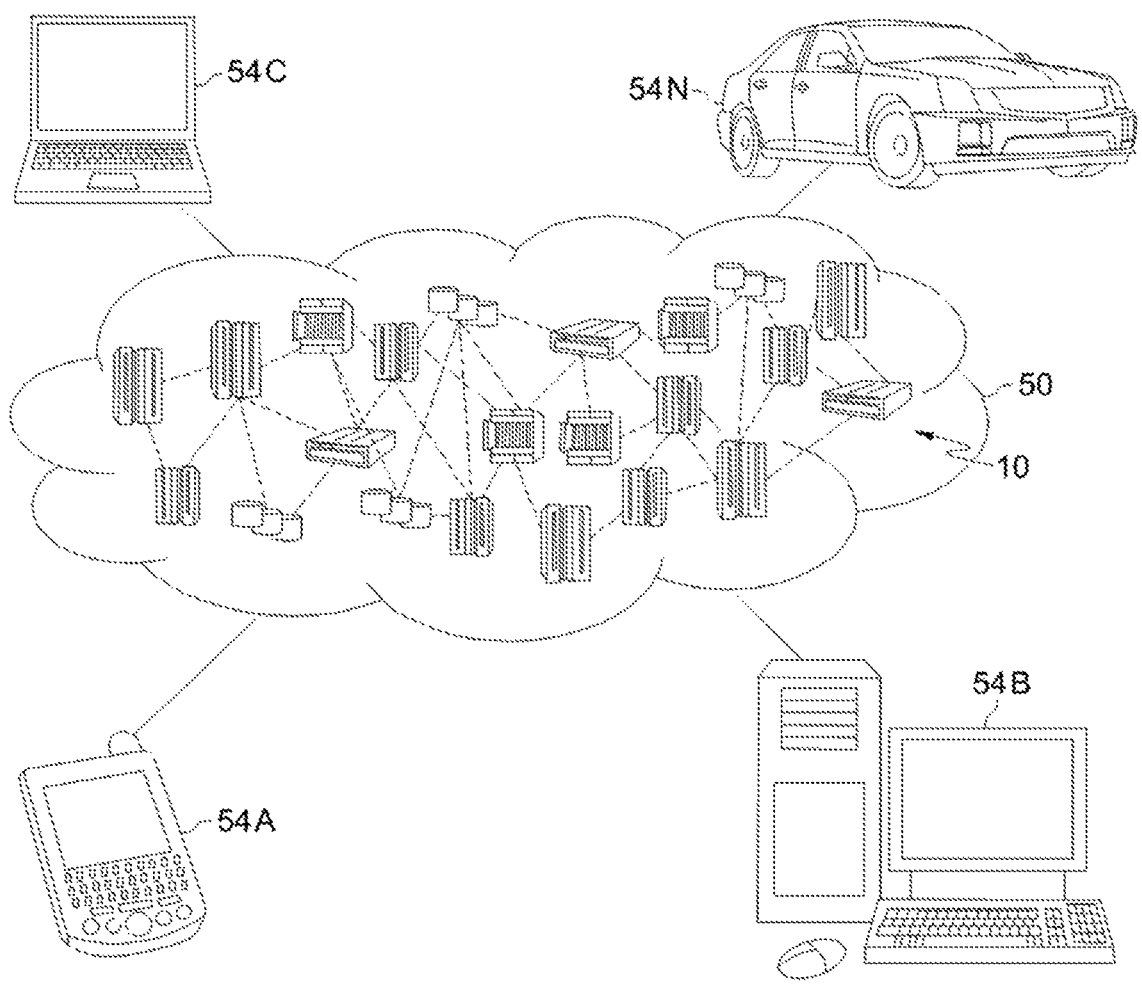
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
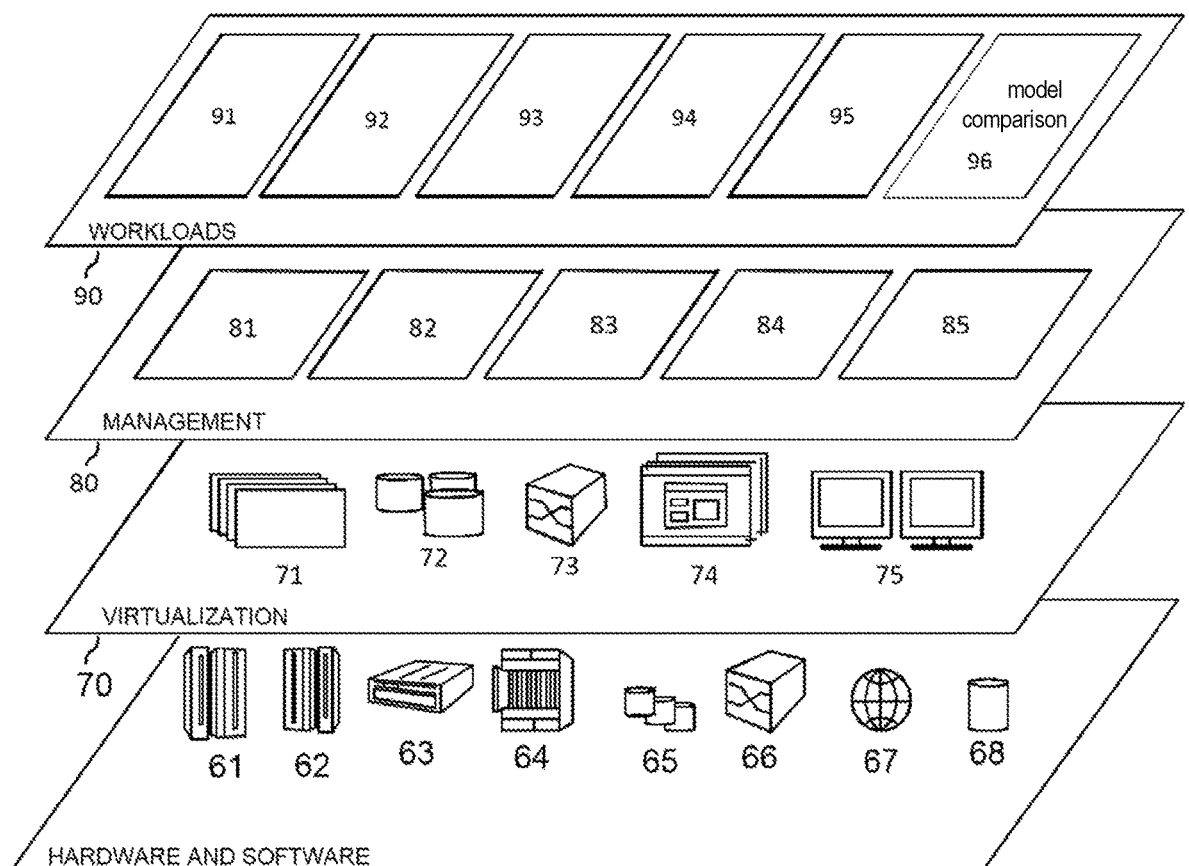
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and model comparison 96.

Implementations of the invention may include a computer system/server 12 of FIG. 1 in which one or more of the program modules 42 are configured to perform (or cause the computer system/server 12 to perform) one of more functions of the model comparison 96 of FIG. 3. For example, the one or more of the program modules 42 may be configured to: execute a test suite on a first version of a software model to generate first metric data; execute the test suite on a second version of the software model to generate second metric data; execute a dimension reduction technique on the first metric data to generate first version principal components that represent the first metric data; execute the dimension reduction technique on the second metric data to generate second version principal components that represent the second metric data; determine at least one control limit based on at least one of the first version principal components; determine a mean value of one of the second version principal components; and compare the mean value to the at least one control limit to determine whether the second version of the software model performs within the at least one control limit.

Figure 4:
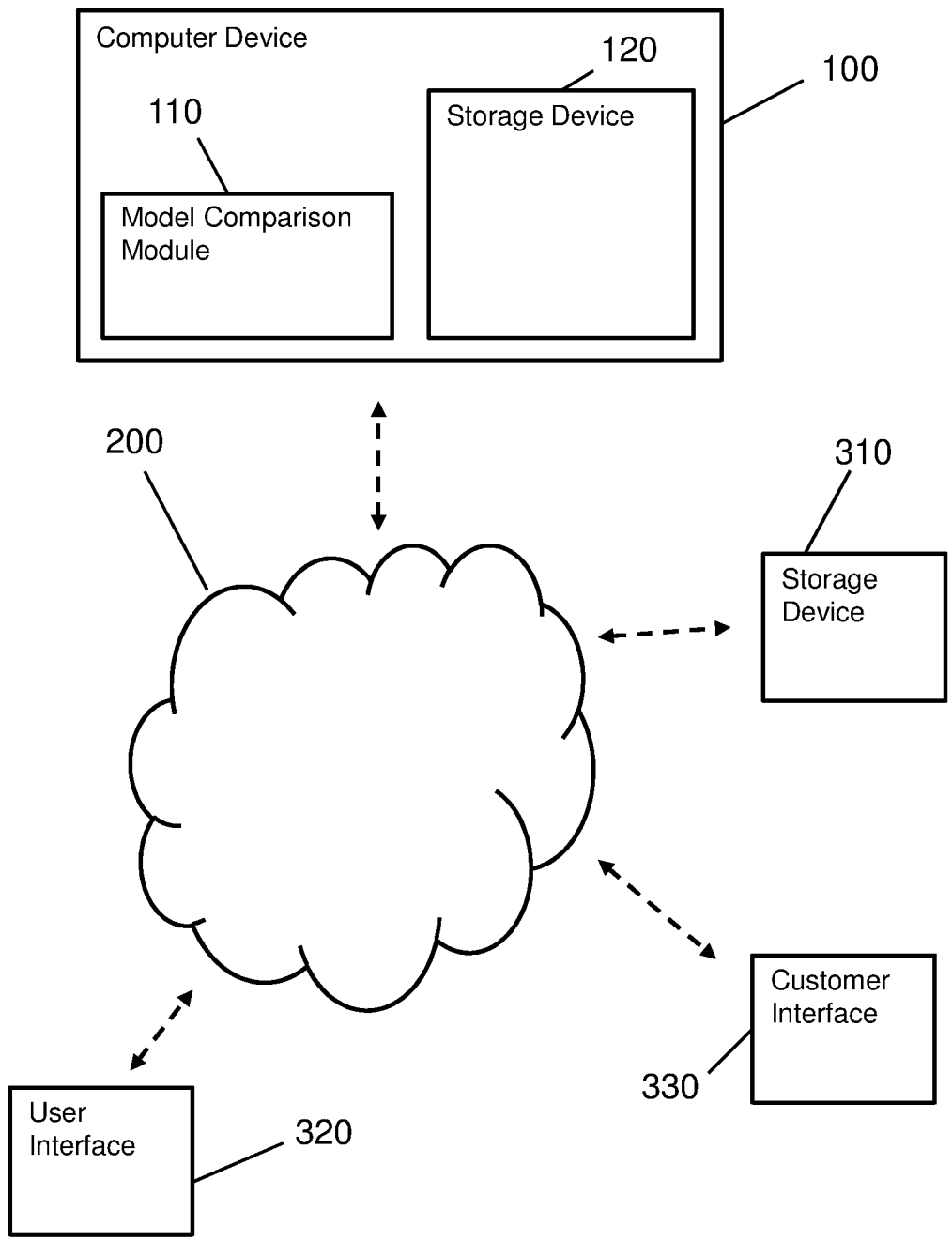
FIG. 4 shows a block diagram of an exemplary environment in accordance with aspects of the disclosure.

FIG. 4 shows a block diagram of an exemplary environment in accordance with aspects of the disclosure. In embodiments, the environment includes a computer device 100 such as, for example, computer system/server 12 in FIG. 1, that communicates over one or more networks 200 such as, for example, cloud computing environment 50. In this example, computer device 100 includes a model comparison module 110, for example, one or more of program modules 42 in FIG. 1, and a storage device 120 such as, for example, storage system 34 in FIG. 1.

FIG. 4 shows an external storage device 310 such as, for example, another computer device having some or all of the features of computer system/server 12 in FIG. 1, that is external to computer device 100 and contains programs and/or data that is accessed by model comparison module 110 (other examples include more than one external storage device 310). In embodiments, one or more other databases that are accessed by model comparison module 110 are stored on storage device 120 and/or storage device 310.

FIG. 4 shows a user interface 320 such as, for example, display 24 in FIG. 1, that displays output from computer device 100 and/or model comparison module 110. In embodiments, user interface 320 is part of a user device such as, for example, a desktop computer, laptop computer, tablet computer, smartphone, etc., that includes one or more components of system 12 and that communicates with computer device 100 via network 200. In embodiments, customer interface 330 is part of a user device such as, for example, a desktop computer, laptop computer, tablet computer, smartphone, etc., (for example, computing devices 54A-N shown in FIG. 2) that communicates with computer device 100 via network 200.

In model testing, it is sometimes not known which metric should be used, or is best to use, in comparing versions of the model. In some cases, the user of the software does not know what metric should be used in the testing. In embodiments, model comparison module 110 applies a dimension reduction algorithm using principal component analysis (PCA) to the available metrics and then uses a first (or top) principal component resulting from the PCA as an aggregated metric for further analysis.

In embodiments, model comparison module 110 validates the new version of the model (new version) in a pre-production environment before the new version is pushed to production. To validate the new version (or any model), model comparison module 110 executes a test suite. In embodiments, the test suite contains a single test case or a set of test cases. A goal of the test case is to evaluate the new version (or any model) to ascertain its performance. In embodiments, evaluation of a model is based on using known label data, getting predictions for such data from the model, and calculating evaluation metrics describing model performance. Model comparison module 110 calculates, in general, values for the metrics by comparing known target/labels with predictions. Non-exclusive examples of such metrics include accuracy, precision, recall, log loss, etc.

Execute Test Suite Against the Models

Model comparison module 110 produces a set of metrics as a result of running the test suite against the models. In embodiments, model comparison module 110 calculates a value for each of various metrics for each executed test case under the test suite.

In embodiments, when there is only a single test case, model comparison module 110 applies cross-validation techniques to have more than a single metric measurement. In embodiments, the cross-validation technique splits the original data set used into multiple data sets and executes the test/validation on each of them separately, returning a metric for each sub-set. An example of splitting the original data set into multiple data sets is k-fold cross-validation. Executing the test suite generates a set of metrics for each sub-set. For example, in an embodiment where k=10 in the k-fold cross-validation, which means that the original data is split into 10 sub-sets, executing the test suite generates 10 sets of metrics.

In embodiments, model comparison module 110 generates metrics data by executing the test suite against the new version of the model. The following is an example of a test using three test cases.

testcase 1
accuracy|precision|recall
0.8|0.7|0.86
testcase 2
accuracy|precision|recall
0.9|0.87|0.92
testcase 3
accuracy|precision|recall
0.95|0.9|0.99

In embodiments, model comparison module 110 generates metrics data for the currently used (production) version by executing the same test suite against the production version of the model. The results are stored in the same form.

testcase 1
accuracy|precision|recall
0.85|0.75|0.86
testcase 2
accuracy|precision|recall
0.89|0.86|0.91
testcase 3
accuracy|precision|recall
0.99|0.95|0.99

Dimensional Reduction of Metrics Data

In embodiments, after model comparison module 110 generates the above metrics data, model comparison module 110 performs dimension reduction of the metrics data where, for example, there exists no information about importance of the various metrics. Model comparison module 110 considers all of the metrics used by applying a dimension reduction technique such as, for example, principal component analysis (PCA) to the metrics data. A goal of PCA is to reduce the number of metrics used in a comparison of the new version to the production version. In embodiments, the first principal component returned by PCA explains most of the variance over the metrics data, which, in many instances is sufficiently accurate for use in evaluating the new version. As a result of PCA, a user does not need to know which metric is the most important in evaluating the versions because the system captures the importance, difference, and variation of all of the metrics inside the first principal component.

The result of model comparison module 110 performing PCA on the metrics data for the new version produces a principal components array (matrix). In this example, model comparison module 110 performs PCA to produce two principal components for each test case (other examples produce three or more principal components for each test case). In embodiments, model comparison module 110 uses two principal components in order to cause the first principal component to explain a higher percentage of the metrics being used and, as a result, clearly show how accurate the model is. In this example, using the three test cases shown above having the metrics of accuracy, precision, and recall, the principal component array has a first column that is the first principal component associated with each test case, and a second column that is the second principal component associated with each test case. The principal components array for this example is as follows:

[[0.16158604, −0.00752452],
[−0.04164802, 0.02705752],
[−0.11993802, −0.019533]]

In further processing using PCA, model comparison module 110 produces a 1×2 variance array (because there are two principal components) that shows the importance of the first principal component and the other principal components (in this case the second principal component). The variance array for this example is as follows:

[0.97303536, 0.02696464]

In the above variance array, the first number being 0.97303536 indicates that the first component explains approximately 97.3 percent of the metrics used in the test of the new version. The second number being 0.02696464 indicates that the second component explains approximately 2.7 percent (the balance) of the metrics used in the test of the new version.

The results of model comparison module 110 performing PCA on the metrics data for the production version produce the following principal component array and variance array:

[[−0.13319869, −0.01165706],
[−0.01017924, 0.02099589],
[0.14337793, −0.00933883]]
[0.98300525, 0.01699475]

In the above variance array, the first number being 0.98300525 indicates that the first component explains approximately 98.3 percent of the metrics used in the test of the production version. The second number being 0.01699475 indicates that the second component explains approximately 1.7 percent (the balance) of the metrics used in the test of the production version. In this example, the first principal component in both the case of the new version and the case of the production version explains over 97% of all metrics.

Controlling Limits Calculation

In embodiments, model comparison module 110 uses the first principal component from the production test to calculate control limits according to the following formulas:

$$\text{upper control limit} = \text{MEAN}(X\_PROD) + R*A2$$

$$\text{lower control limit} = \text{MEAN}(X\_PROD) - R*A2$$

$$R = \text{MAX}(X\_PROD) - \text{MIN}(X\_PROD)$$

where MAX(X_PROD) is the maximum value of the first principal component, MIN(X_PROD) is the minimum value of the first principal component, and A2 is a correction constant. R is the difference between the maximum value of the first principal component MAX(X_PROD) and the minimum value of the first principal component MIN(X_PROD). Correction constant A2 is a value from statistic tables, where the value depends on the number of measurements taken (in this case, the number of test cases).

For the above example, model comparison module 110 produces the following values for the above formulas:

R=0.27658
upper control limit=0.02829
lower control limit=−0.02829

In embodiments, model comparison module 110 uses the upper control limit and the lower control limit as the limits for determining if the new model is validated for production use. In other embodiments, model comparison module 110 uses only the upper control limit as the limit for determining if the new model is validated for production use.

Calculate Mean Value of Principal Component for the New Version

Figure 5:
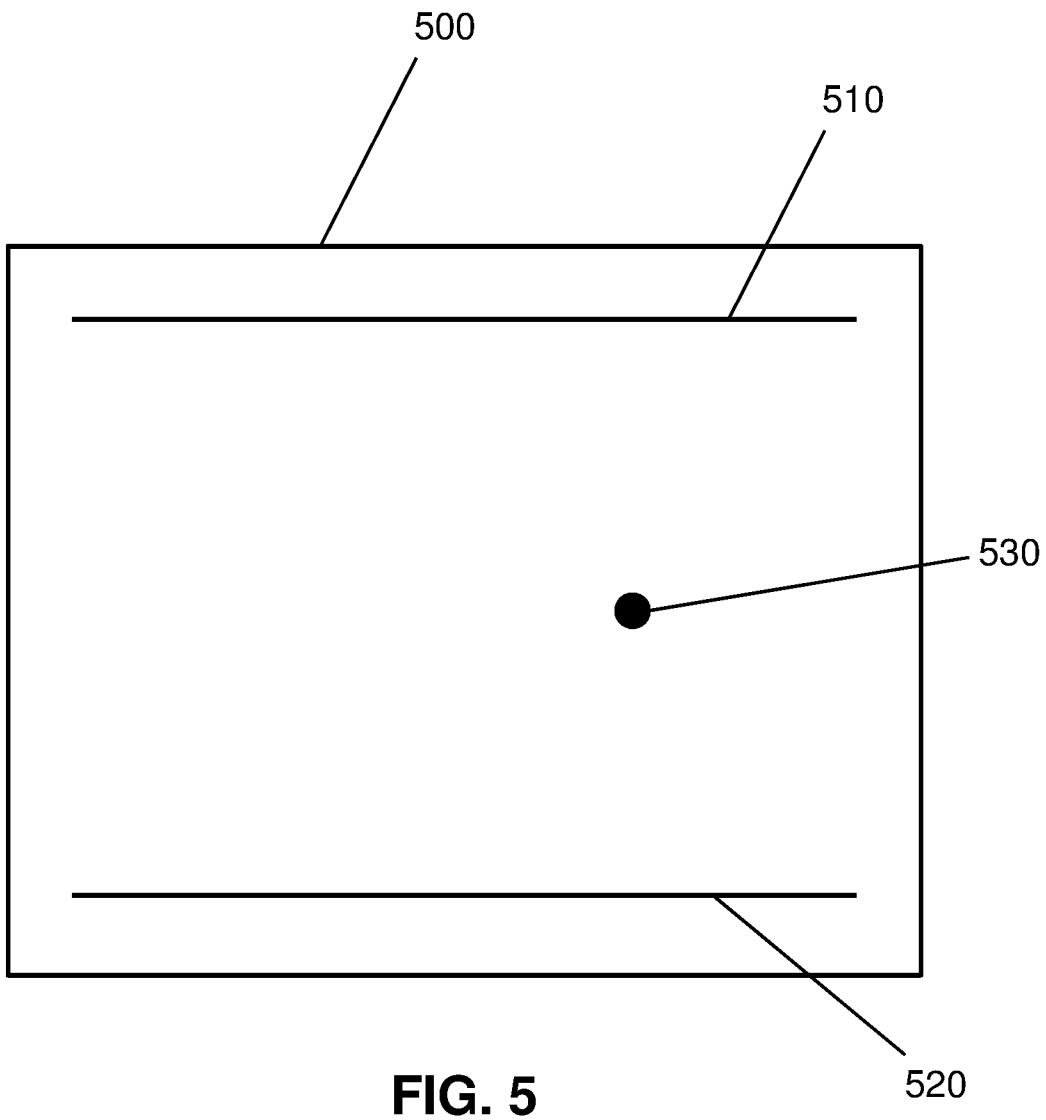
FIG. 5 is a graph depicting a comparison in accordance with aspects of the disclosure.

In embodiments, model comparison module 110 calculates a mean value of the first principal component for the new version and determines whether this value is between the upper control limit (UCL) and the lower control limit (LCL) determined above. If the mean value of the first principal component for the new version is between the UCL and the LCL, then model comparison module 110 determines that the new version should be used in production. In the above example, the mean value of the first principal component for the new version is 0 (zero). As shown in FIG. 5 on chart 500, in this example, model comparison module 110 validates the new version for production because the mean value of the first principal component for the new version 530 (0) is between the UCL 510 (0.02829) and the LCL 520 (−0.02829).

In embodiments, model comparison module 110 notifies a user of computer device 100 whether the mean value of the first principal component for the new version is between the UCL and the LCL. In embodiments, model comparison module 110 recommends (to the user) implementing the second version of the software model in place of the first version as a result of the mean value of the first principal component for the new version being between the UCL and the LCL.

In other embodiments, model comparison module 110 treats the UCL or the LCL as a threshold and compares the mean value of the first principal component for the new version to such threshold. For example, model comparison module 110 validates the new version for production if the mean value of the first principal component for the new version is not above the UCL.

In embodiments, computer device 100 comprises model comparison module 110, which may comprise one or more program modules such as program modules 42 described with respect to FIG. 1. Computer device 100 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

Figure 6:
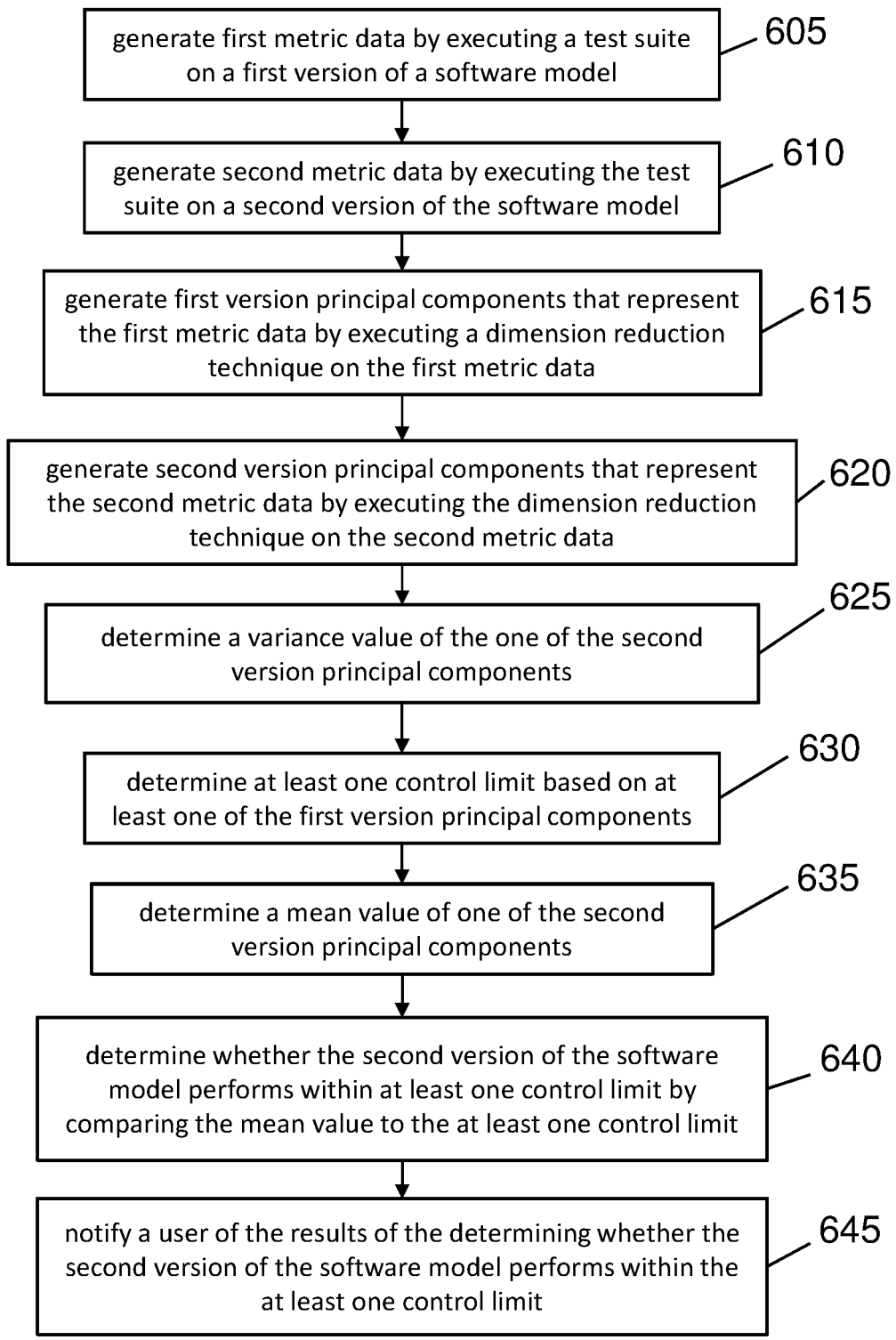
FIG. 6 shows a flowchart of an exemplary method in accordance with aspects of the disclosure.

FIG. 6 shows a flowchart of an exemplary method in accordance with aspects of the present disclosure. Steps of the method may be carried out in the environment of FIG. 4 and are described with reference to elements depicted in FIG. 4.

At step 605, the system generates first metric data by executing a test suite on a first version of a software model. In embodiments, and as described with respect to FIG. 4, the model comparison module 110 generates first metric data stored on storage device 120 by executing a test suite stored on storage device 120 on a first version of a software model stored on storage device 120.

At step 610, the system generates second metric data by executing the test suite on a second version of the software model. In embodiments, and as described with respect to FIG. 4, the model comparison module 110 generates second metric data stored on storage device 120 by executing the test suite stored on storage device 120 on a second version of the software model tested in step 605 (stored on storage device 120).

At step 615, the system generates first version principal components that represent the first metric data by executing a dimension reduction technique on the first metric data. In embodiments, and as described with respect to FIG. 4, the model comparison module 110 generates first version principal components that represent the first metric data by executing a dimension reduction technique on the first metric data stored on storage device 120.

At step 620, the system generates second version principal components that represent the second metric data by executing the dimension reduction technique on the second metric data. In embodiments, and as described with respect to FIG. 4, the model comparison module 110 generates second version principal components that represent the second metric data by executing the dimension reduction technique on the second metric data stored on storage device 120.

At step 625, the system determines a variance value of the one of the second version principal components. In embodiments, and as described with respect to FIG. 4, the model comparison module 110 determines a variance value of the one of the second version principal components.

At step 630, the system determines at least one control limit based on at least one of the first version principal components. In embodiments, and as described with respect to FIG. 4, the model comparison module 110 determines at least one control limit 510, 520 based on at least one of the first version principal components.

At step 635, the system determines a mean value of one of the second version principal components. In embodiments, and as described with respect to FIG. 4, the model comparison module 110 determines a mean value 530 of one of the second version principal components.

At step 640, the system determines whether the second version of the software model performs within at least one control limit by comparing the mean value to the at least one control limit. In embodiments, and as described with respect to FIG. 4, the model comparison module 110 determines whether the second version of the software model performs within the at least one control limit 510, 520 by comparing the mean value 530 to the at least one control limit 510, 520.

At step 645, the system notifies a user of the results of the determining whether the second version of the software model performs within the at least one control limit. In embodiments, and as described with respect to FIG. 4, the model comparison module 110 notifies a user of the results of the determining whether the second version of the software model performs within the at least one control limit 510, 520.

In embodiments, a service provider could offer to perform the processes described herein. In this case, the service provider can create, maintain, deploy, support, etc., the computer infrastructure that performs the process steps of the disclosure for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the disclosure provides a computer-implemented method, via a network. In this case, a computer infrastructure, such as computer system/server 12 (FIG. 1), can be provided and one or more systems for performing the processes of the disclosure can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
generating, by a computing device, first metric data by executing a test suite on a first version of a software model, the test suite having a number of test cases;
generating, by the computing device, second metric data by executing the test suite on a second version of the software model;
generating, by the computing device, a first version principal component matrix including first version principal components that represent the first metric data by executing a dimension reduction technique on the first metric data, the first version principal component matrix having a dimension equal to the number of test cases;
generating, by the computing device, a second version principal component matrix including second version principal components that represent the second metric data by executing the dimension reduction technique on the second metric data, the second version principal component matrix having a dimension equal to the number of test cases, an importance of each metric datum of the second metric data being unknown;
producing, by the computing device and through further processing using principal component analysis, a variance array that shows an importance of each of a plurality of principal components of the second version principal components;
determining, by the computing device, at least one control limit based on at least one of the first version principal components;
determining, by the computing device, a mean value of one of the second version principal components;
determining, by the computing device, whether the second version of the software model performs within the at least one control limit by comparing the mean value to the at least one control limit; and
notifying, by the computer device, a user of the results of the determining whether the second version of the software model performs within the at least one control limit.

2. The method of claim 1, wherein the dimension reduction technique is principal component analysis (PCA).

3. The method of claim 2, wherein the one of the second version principal components is the first principal component of the second version principal components in the PCA.

4. The method of claim 3, wherein the test suite obtains, by the computing device, values for a plurality of metrics.

5. The method of claim 4, wherein the plurality of metrics comprises accuracy, precision, and recall.

6. The method of claim 4, further comprising determining, by the computing device, a variance value of the one of the second version principal components, the variance value indicating a level of similarity between the one of the second version principal components and the plurality of metrics.

7. The method of claim 4, wherein the at least one control limit comprises an upper control limit and a lower control limit.

8. The method of claim 7, wherein the computing device determines that the second version of the software model performs within the at least one control limit as a result of the mean value being between the upper control limit and the lower control limit.

9. The method of claim 3, wherein the executing the test suite on the first version of the software model comprises producing the first metric data by running the first version of the software model using test data, and
the executing the test suite on the second version of the software model comprises producing the second metric data by running the second version of the software model using the test data.

10. The method of claim 9, wherein the first version of the software model is a currently used version of the software model, and
the second version of the software model is a new version of the software model.

11. The method of claim 1,
wherein a dimension of the variance array is a number of the plurality of principal components of the second version principal components, and
a value of an element of the variance array indicates what percentage of the second metric data is explained by the corresponding principal component of the plurality of principal components.

12. A computer program product comprising one or more computer readable storage media having program instructions collectively stored on the one or more computer readable storage media, the program instructions executable to:
generate second metric data by executing a test suite on a second version of a software model, the test suite having a number of test cases;
generate a first version principal component matrix including first version principal components that represent first metric data by executing a dimension reduction technique on first metric data, the first metric data corresponding to a first version of the software model, the first version principal component matrix having a dimension equal to the number of test cases;
generate a second version principal component matrix including second version principal components that represent the second metric data by executing the dimension reduction technique on the second metric data, the second version principal component matrix having a dimension equal to the number of test cases;
produce, through further processing using principal component analysis, a variance array that shows an importance of each of a plurality of principal components of the second version principal components;
determine at least one control limit based on at least one of the first version principal components;
determine a mean value of one of the second version principal components; and
determine whether the second version of the software model performs within the at least one control limit by comparing the mean value to the at least one control limit.

13. The computer program product of claim 12, wherein the program instructions are further executable to generate the first metric data by executing the test suite on the first version of the software model.

14. The computer program product of claim 12, wherein the program instructions are further executable to receive the first metric data.

15. The computer program product of claim 12, wherein the dimension reduction technique is principal component analysis (PCA).

16. The computer program product of claim 15, wherein the one of the second version principal components is the first principal component of the second version principal components in the PCA.

17. A system comprising:
- a processor, one or more computer readable storage media, and program instructions collectively stored on the one or more computer readable storage media, the program instructions executable to:
- generate second metric data by executing a test suite on a second version of a software model, the test suite having a number of test cases;
- generate a first version principal component matrix including first version principal components that represent first metric data by executing a dimension reduction technique on the first metric data, the first version principal component matrix having a dimension equal to the number of test cases, the first metric data corresponding to a first version of the software model;
- generate a second version principal component matrix including second version principal components that represent the second metric data by executing the dimension reduction technique on the second metric data, the second version principal component matrix having a dimension equal to the number of test cases;
- produce, through further processing using principal component analysis, a variance array that shows an importance of each of a plurality of principal components of the second version principal components;
- determine at least one control limit based on at least one of the first version principal components; and
- determine a mean value of one of the second version principal components.

18. The system of claim 17, further comprising program instructions executable to determine whether the second version of the software model performs within at the least one control limit by comparing the mean value to the at least one control limit.

19. The system of claim 18, wherein the dimension reduction technique is principal component analysis (PCA), and the one of the second version principal components is the first principal component of the second version principal components in the PCA.

20. The system of claim 17, further comprising program instructions executable to generate the first metric data by executing the test suite on the first version of the software model.

* * * * *